United States Patent [19]

Palfery et al.

[11] Patent Number: 4,617,720

[45] Date of Patent: Oct. 21, 1986

[54] AUTOMATED MACHINE TOOL HAVING A ROTARY INDEXING FIXTURE

[75] Inventors: Kenneth J. Palfery, Toronto; Donald R. Puckering, Georgetown; Angel Kocev, Toronto; Kenrick B. Maharaj, Brampton, all of Canada

[73] Assignee: McDonnell Douglas Corporation, Long Beach, Calif.

[21] Appl. No.: 681,793

[22] Filed: Dec. 14, 1984

[51] Int. Cl.⁴ .............................................. B23Q 3/157
[52] U.S. Cl. ....................................... 29/568; 409/221
[58] Field of Search ................ 29/568, 563, 564, 561, 29/26 A; 414/783, 749, 750; 901/6, 41; 409/221, 226, 224

[56] References Cited

U.S. PATENT DOCUMENTS 4,090,287 5/1978 Sezander ............................. 29/568

FOREIGN PATENT DOCUMENTS 112753 8/1980 Japan ................................. 29/568

Primary Examiner—William R. Briggs
Attorney, Agent, or Firm—Benjamin Hudson, Jr.; George W. Finch; Donald L. Royer

[57] ABSTRACT

There is provided by this invention an automated machine tool having a rotary indexing table that allows the machine tool to precisely rotate a workpiece 360° to perform a machining function. The rotary indexing table has an aperture therein designed to accommodate an indexing tool supported in a rotatable spindle such that with appropriate movements of the moveable worktable the indexing tool causes rotation of the rotary indexing table to a precise position.

2 Claims, 4 Drawing Figures

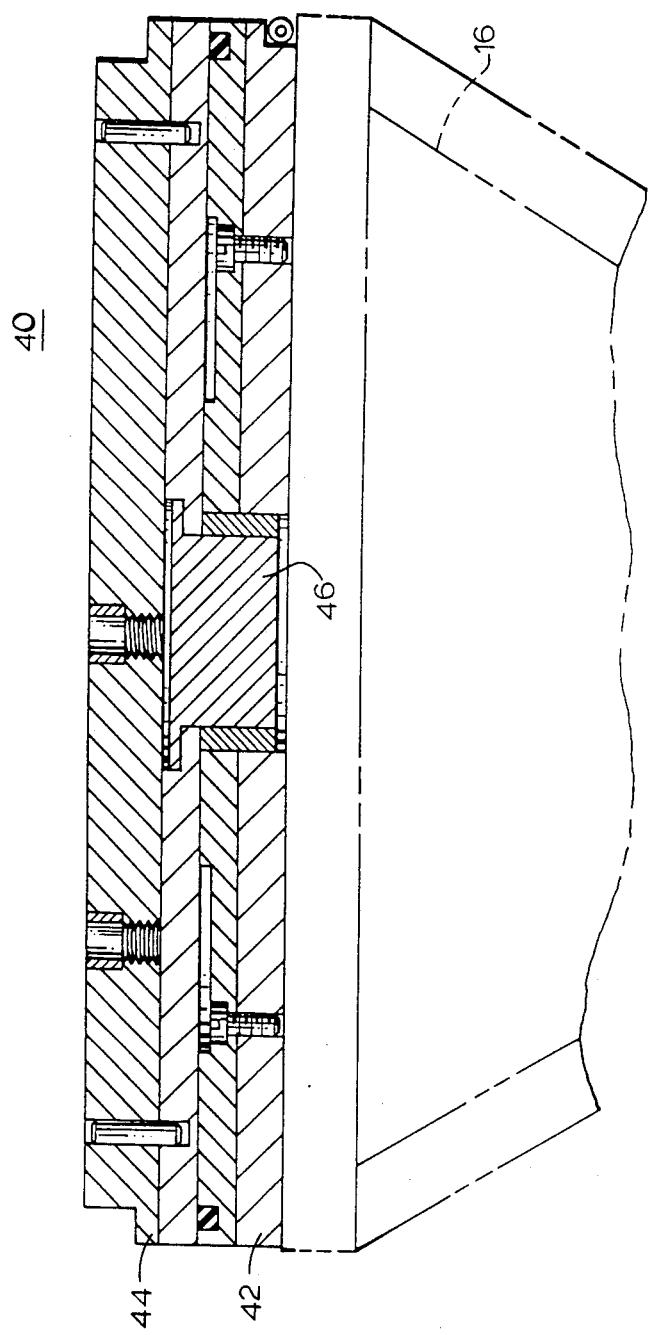

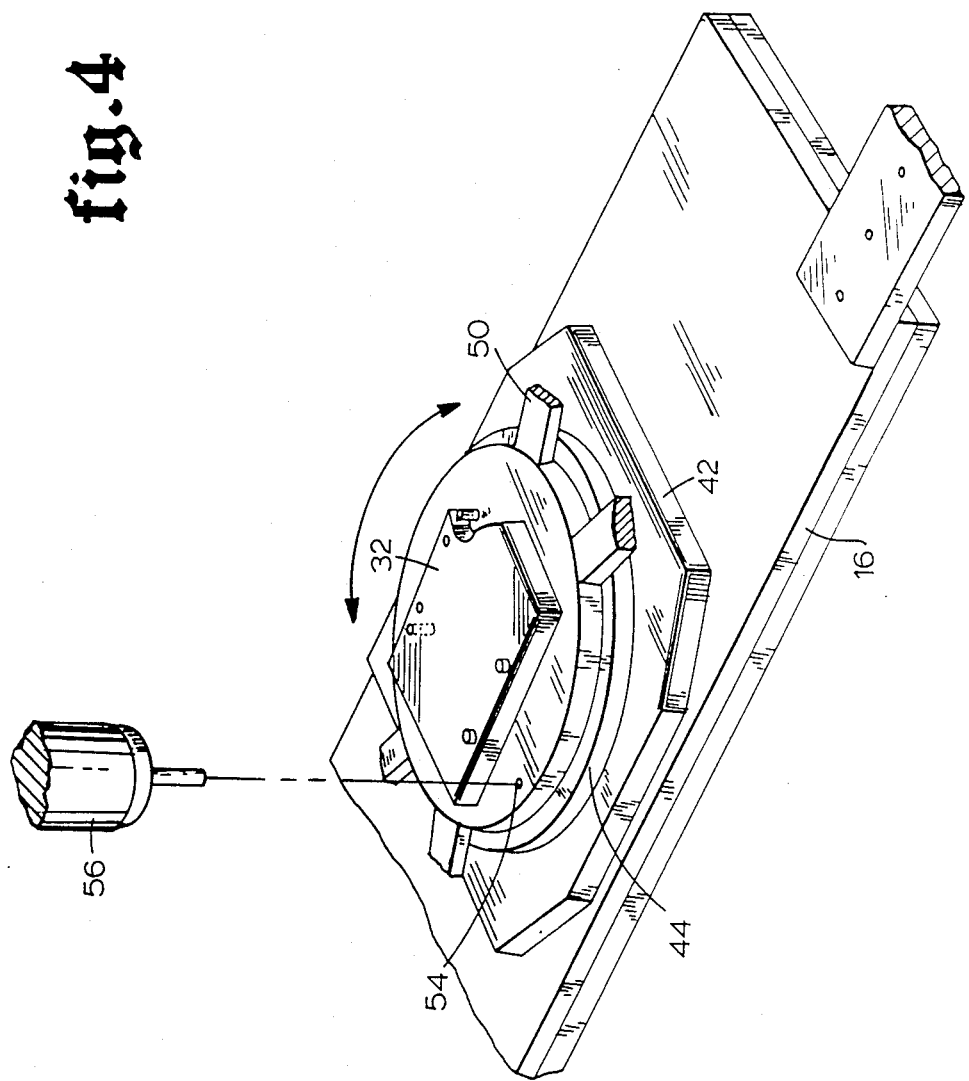

AUTOMATED MACHINE TOOL HAVING A ROTARY INDEXING FIXTURE

CROSS-REFERENCE TO RELATED APPLICATIONS

This application is related to the co-pending U.S. patent application Ser. No. 681,802.

BACKGROUND OF THE INVENTION

1. FIELD OF THE INVENTION

This invention relates generally to automated machine tools programmable to perform multiple machining functions on a workpiece, and more particularly to automated machine tools having a rotary indexing table for rotating the workpiece 360°.

2. DESCRIPTION OF THE PRIOR ART

Automated machine tools are wellknown in the art that perform a variety of cutting functions such as milling, drilling, threading, tapping, etc. on a workpiece. These machines are normally provided with a tool carrousel that has numerous cutting tools mounted thereon for performing the variety of functions of the machine. The tool holder is generally a rotatable tool spindle mounted in a drill head adjustably mounted on a vertical column or quill for vertical movement thereon. The tool spindle is mounted for rotation relative to the quill and is moveable axially with respect to the drill head. Additionally, the workpiece is secured to a worktable that is moveable in a x-y horizontal plane for providing a variety of positions to perform the various cutting operations.

The machining operation is performed by the rotatable tool spindle rotatably mounted in a spindle head and arranged to be shifted vertically with respect to the workpiece. Precision cutting is performed, such that a hole center may be precisely located with respect to the axis of the rotatable tool spindle and the combined movement of the worktable in its horizontal plane of movement. During the machining operation, the spindle is rotated at a pre-selected cutting speed and is fed downwardly by the drill head on the quill at a predetermined feed rate. The cutting tool is removably mounted in a chuck of a design wellknown in the art, which is carried by the lower end of the rotatable tool spindle and which forms a part thereon. Additionally, a tool changer is adapted to remove the used tool from the chuck at the end of a cutting operation and replace the used tool with a pre-selected new tool in an automatic manner that eliminates lost time associated with manual tool changing operations.

All these functions are carried out in rapid efficient manner in order to bring about the most efficient operation of the machine tool. The automatic control of the machine tool is provided by a numerical control system operated under the control of a punch tape or other memory device which regulates the table so as to locate a cutting center with respect to the axis of the tool, the automatic selection of the spindle speed, the spindle feed rate on the quill, and other machine functions.

In addition to these operations, it would be desirable if an automated machine tool had the capability to rotate the workpiece on the moveable worktable to efficiently perform continuous machining operations on the workpiece without manually changing the orientation of the workpiece on the moveable worktable.

SUMMARY OF THE INVENTION

There is provided by this invention an automated machine tool having a rotary indexing table that allows a workpiece to be rotated on the worktable to perform continuous machining operation eliminating the need for manual operation to change the orientation of the workpiece on the machine tool. The rotary indexing table has an aperture therein designed to accommodate an indexing tool supported in a rotatable spindle such that with appropriate movements of the moveable worktable the indexing tool causes rotation of the rotary indexing table to a precise position.

BRIEF DESCRIPTION OF THE DRAWINGS

FIG. 3 is a view taken generally along the lines of VII—VII of FIG. 2;

FIG. 4 is a perspective view of the rotary indexing table.

BRIEF DESCRIPTION OF THE PREFERRED EMBODIMENTS

Figure 1:
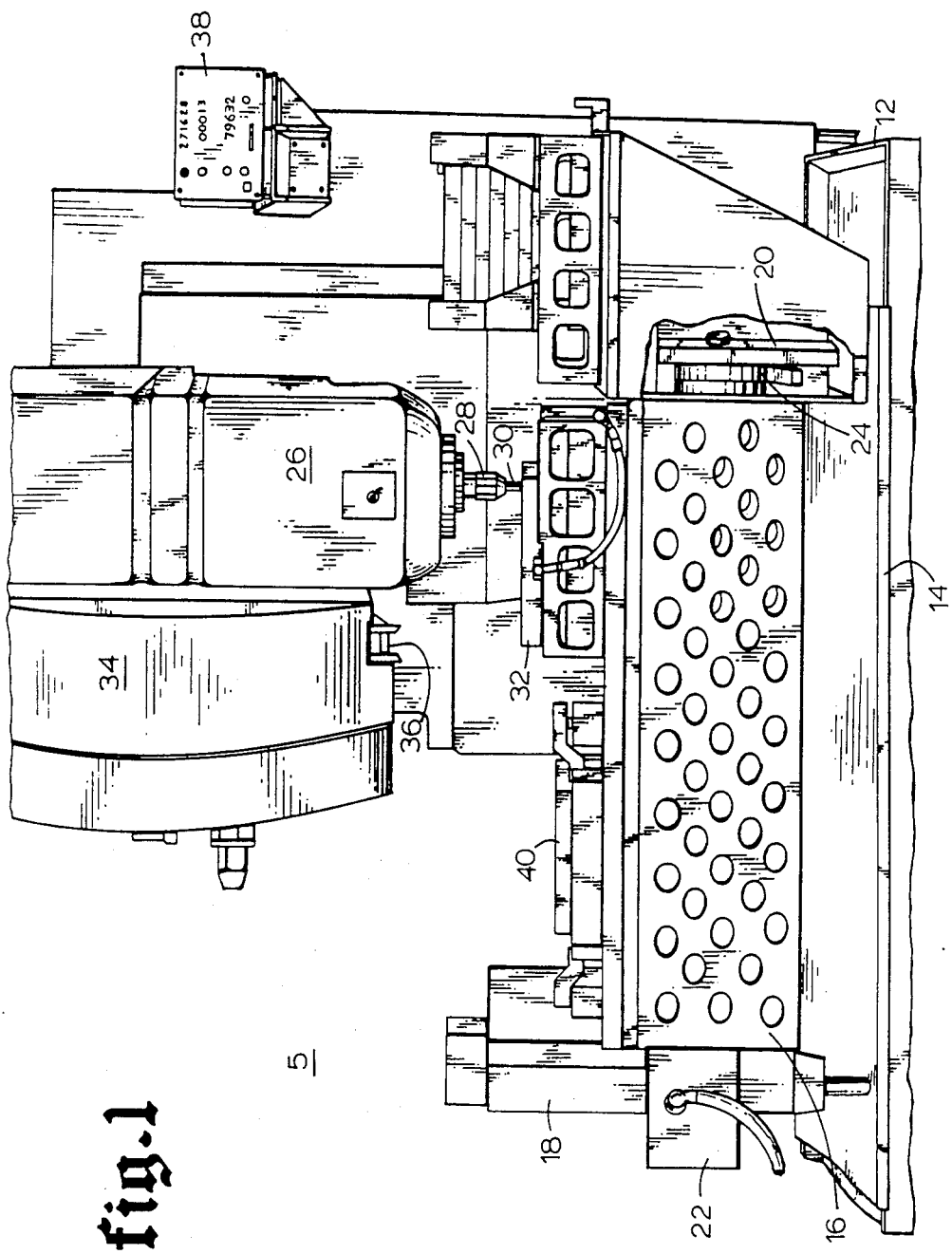
FIG. 1 is a perspective view of an automated machine tool incorporating the principles of this invention.

Referring to FIG. 1, there is shown an automated machining center 5. The automated machining center 5 is generally comprised of a frame 12 having mounted thereon a moveable bed 14 that is disposed to move longitudinally and latitudinally in a horizontal plane. Mounted on the moveable bed 14 is an elongated trunnion worktable 16 that is pivotally supported at each end by support structures 18 and 20 such that the worktable may be rotated about its horizontal axis by means of a drive motor 22. The trunnion worktable is extended to allow machining of large parts. A hydraulic brake 24 is mounted on a support 20 and actuated to apply friction braking to stop rotation of the trunnion worktable 16 at a desired position. Rotation of the trunnion worktable 16 about its horizontal axis allows precision angular cutting to be performed on a workpiece with respect to the vertical axis of a cutting tool. A workpiece 32 may be machined by rotation of the trunnion worktable 16 simultaneously with x-y movements of the table in its horizontal plane. A drive head indicated generally at 26 is mounted to the support frame 12 and is disposed to move in a vertical direction by means of a quill type shaft, not shown but well known in the art. Supported at the end of the drive head 26, is a spindle 28 that holds a machine cutting tool 30. The drive head 26 is disposed to rotate the spindle 28 and the cutting tool 30 at a fixed speed rate to cut and machine the workpiece 32 that is mounted to the worktable 16. A tool changing carrousel 34 is also supported on the support frame 12 in close proximity to the drill head 26 to store a multitude of different cutting tools that can be supported in the spindle 28 to perform different machine operations on the workpiece 32. When it is desired to change the cutting tool to perform a different machining operation, a tool changing arm 36 detaches the tool 30 from the spindle 28, returns the used tool to the tool changing carrousel 34, removes a new tool from the tool changing carrousel 34, and inserts it into the rotatable spindle 28 to perform a new machining operation. Mounted on the trunnion worktable 16 is a rotary indexing table 40 that rotates the workpiece 360° to allow for different orientations of the workpiece on the moveable worktable.

The various automated machining functions and precise alignment of the automated machine tool 5 are controlled by a programmable control unit 38. The programmable control unit 38 may be a numerical control system with its program stored on a punch tape or other memory device. The programmable control unit 38 in addition to performing other functions that will be later described, controls the rotary indexing table 40, the movement of the trunnion worktable 16 in a horizontal plane, the rotation of the trunnion worktable 16 about its horizontal axis, the speed rate of the rotatable spindle 28, and the automatic operation of the tool changing arm 36 to detach a used tool from the rotatable spindle 28 and exchange it with a tool stored in the tool changing carrousel 34.

Figure 2:
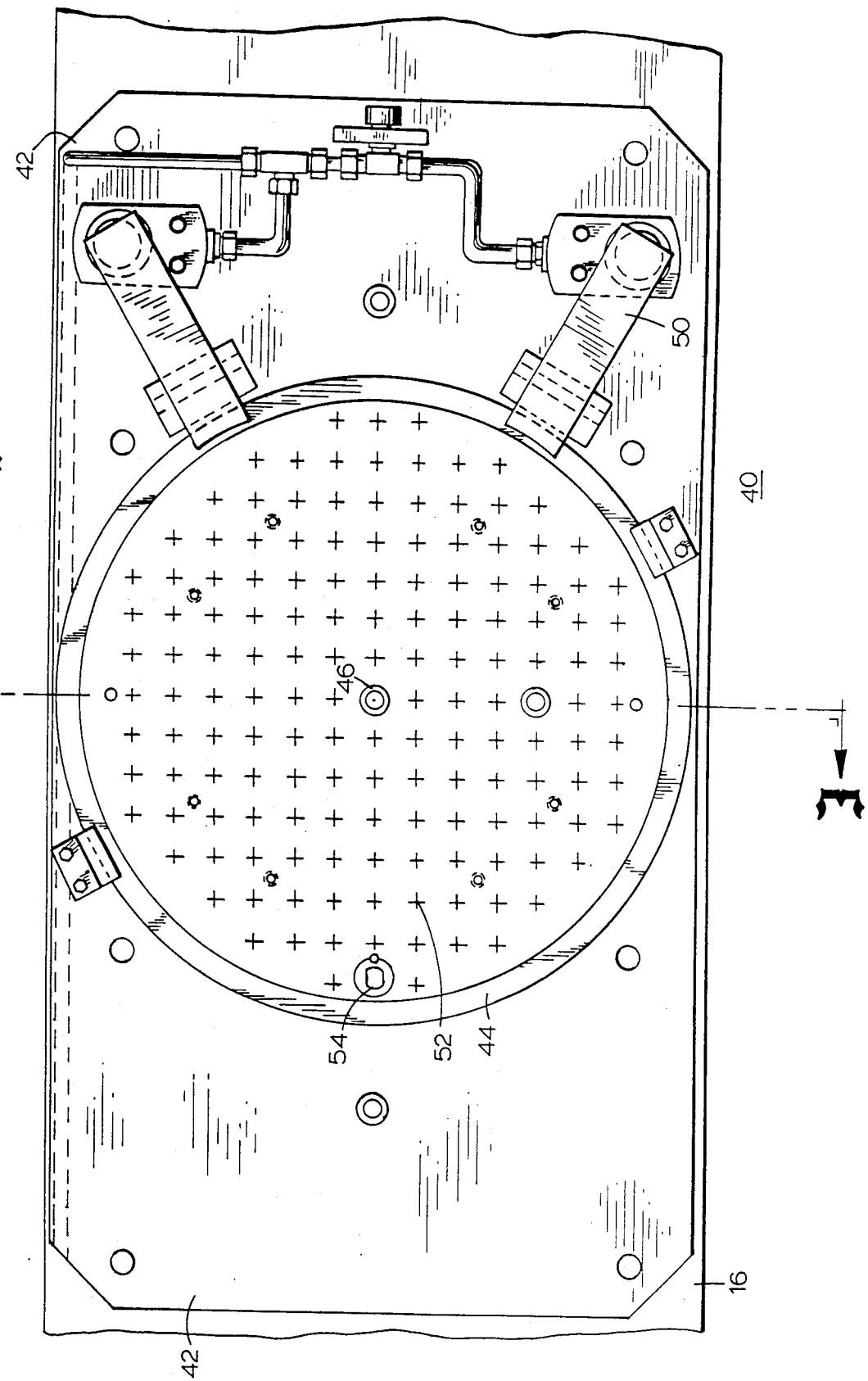
FIG. 2 is a top view of the rotary indexing table shown in FIG. 1 incorporating the principles of this invention.

Referring to FIGS. 2 and 3, there is shown the rotary indexing table 40 that is generally comprised of a baseplate assembly 42 upon which is mounted a circular table 44 that rotates about a centerpin 46 that is part of the baseplate assembly 42. Four automatic operated hydraulic clamps such as 50 are spaced around the periphery of the circular table 42 to lock it in position. The circular table 42 has a multitude of threaded apertures 52 to which the workpiece may be bolted. An indexing aperture 54 is provided in the circular table to cause rotation in a manner hereinafter described.

Referring to FIG. 4, to rotate the workpiece 32 to a different orientation on the trunnion worktable 16, an indexing tool 56 is inserted into the rotatable spindle 28 and positioned into an indexing aperture 54 provided in the circular table 42. The hydraulic clamps 50 are then released and the trunnion worktable 16 makes appropriate x-y table movements within its horizontal plane that result in the indexing tool 56 causing rotation of the rotary indexing table 40 to a desired position. The hydraulic clamps 50 are then actuated to clamp the indexing table in its new position.

Although there has been illustrated and described specific detail and structure of operation, it is clearly understood that the same were merely for purposes of illustration and that changes and modifications may be readily made therein by those skilled in the art without departing from the spirit and the scope of this invention.

What we claim is:

1. An automated machine tool having a rotary indexing table, comprising:
   (a) a frame;
   (b) a movable worktable means connected to the frame for supporting a workpiece and movable longitudinally an latitudinally to position a workpiece at a desired point in a horizontal plane;
   (c) a rotatable spindle means for supporting and rotating a cutting tool at a predetermined speed rate, and mounted on a drive head connected to a vertical quill of the frame for vertical movement thereon to machine the workpiece;
   (d) a tool changing means connected to the frame for storing tools and exchanging the tool supported in the rotatable spindle means with one of a multitude of different tools stored therein;
   (e) an indexing tool configured to be supported by the rotatable spindle means;
   (f) a rotatable indexing table for supporting the workpiece mounted on the movable worktable means having an aperture therein for receiving the indexing tool supported in the rotatable spindle means and causing rotation of the workpiece 360° degrees in response to the longitudinal and latitudinal movements of the movable worktable means; and
   (g) a programmable control means disposed to control the movable worktable means, the rotatable spindle means, the tool changing means, and the rotary indexing table for automatically rotating the workpiece on the rotary indexing table for machining.

2. An automated machine tool as recited in claim 1 wherein the indexing tool is disposed to be stored in the tool changing means and supported by the rotatable spindle means for making connection with the rotary indexing table causing the rotation of the rotary indexing table in response to the longitudinal and latitudinal movements of the movable worktable means.

* * * * *